(12) United States Patent
Furter (10) Patent No.: US 6,494,310 B1
(45) Date of Patent: Dec. 17, 2002

(54) METHOD AND DEVICE FOR FEEDING FLAT ITEMS TO INDIVIDUALIZATION

(75) Inventor: Frank Furter, Winterthur (CH)

(73) Assignee: Ferag AG, Hinwil (CH)

( * ) Notice: Subject to any disclaimer, the term of this patent is extended or adjusted under 35 U.S.C. 154(b) by 14 days.

(21) Appl. No.: 09/662,086

(22) Filed: Sep. 14, 2000

(30) Foreign Application Priority Data

Sep. 16, 1999 (CH) ................................. 702/99

(51) Int. Cl.⁷ ............................................... B65G 15/24
(52) U.S. Cl. ................. 198/606; 198/861.3; 198/861.1; 198/626.3; 414/798.9
(58) Field of Search ................................ 198/606, 607, 198/626.1, 626.3, 861.1, 861.3; 271/11, 211, 231, 236; 414/798.9

(56) References Cited

U.S. PATENT DOCUMENTS

| | | | |
|---|---|---|---|
| 1,807,312 A | * 5/1931 | Henley, Jr. .................. | 198/416 |
| 2,577,765 A | 12/1951 | Irmscher | |
| 3,869,038 A | * 3/1975 | Piper et al. .............. | 198/626.1 |
| 4,050,467 A | * 9/1977 | Van Sluis et al. ........... | 100/151 |
| 4,558,859 A | * 12/1985 | Duke et al. .................. | 271/148 |
| 4,618,136 A | * 10/1986 | Pessina et al. .............. | 271/150 |
| 4,750,728 A | * 6/1988 | Keller ...................... | 198/626.1 |
| 4,902,184 A | * 2/1990 | Fritz ....................... | 198/626.1 |
| 5,090,557 A | * 2/1992 | Carmen ................... | 198/626.1 |
| 5,584,477 A | * 12/1996 | Sakai ...................... | 198/626.1 |
| 5,884,749 A | * 3/1999 | Goodman ................... | 198/418 |
| 6,082,526 A | * 7/2000 | Baker et al. ................ | 198/575 |

FOREIGN PATENT DOCUMENTS

| | | |
|---|---|---|
| DE | 91 05 495.8 | 10/1991 |
| EP | 0 700 832 A2 | 11/1996 |

\* cited by examiner

*Primary Examiner*—Christopher P. Ellis
*Assistant Examiner*—Richard Ridley
(74) *Attorney, Agent, or Firm*—Rankin, Hill, Porter & Clark LLP (57) ABSTRACT

Flat items (2) which have an irregular and/or changeable thickness profile are individualized from a substantially lying stack (3/5), wherein the stack serves as buffer between the individualization and the supply of the items (2) and wherein the items (2) arranged in the stack are guided in a stack channel (1) towards the individualization. In order to allow individualization speeds in the range of several tens of thousands of items per hour, the items (2) are supplied to a pre-stack (3) in which the items are conveyed towards individualization in a loose order and being individually laterally guided, the pre-stack (3) is transformed into an individualizing stack (5) and the items are individualized only from the individualizing stack (5). In the individualizing stack (5) the items (2) are guided and conveyed and held in a stable order as a stack, i.e. with forces transmitted via the items. The pre-stack (3) takes over the buffer function and therefore comprises a substantially freely selectable number of items (2) which varies within wide limits. The number of items (2) in the individualizing stack (5) is considerably smaller and is kept constant within tight limits.

21 Claims, 4 Drawing Sheets

METHOD AND DEVICE FOR FEEDING FLAT ITEMS TO INDIVIDUALIZATION

BACKGROUND OF THE INVENTION

The present invention relates to a method and a device for feeding flat items to individualization, for example individualization for creating a regularly clocked stream of items, i.e. a stream in which single items are conveyed at regular distances or overlapping each other in a regular manner.

Flat items are individualized for processing, whereby single items are separated in succession from a group of items and are supplied to processing individually in a stream of items. In order to achieve continuous processing, the group of items serves normally as a buffer of items between the individualization and the supply of the items. This means that the group of items comprises a number of items varying within limits. The limits are such that there are sufficient items in the group to allow uninterrupted feeding to the individualizing process during expected supply gaps and to be able to absorb interruptions of the individualizing process without generating disturbances. The supply of items to the group of items may take place in batches or substantially continuously. The group of items from which the items are individualized is complemented regularly or, if required, with a plurality of items (batch) or items are continuously of, if required, added in form of a substantially continuous stream, for example a scaled stream.

For flat items it is obvious to use a stack of items as a group serving as buffer from which items are individualized, a stack being understood to be a formation in which the main surfaces of the flat items lie against each other. Items are removed individually (individualized) from the one face of the stack while items are added to the other face of the stack, either in stacked form (batch-wise feeding) or in a quasi-continuous stream (e.g. scaled stream).

In the further processing of printed products, many devices for individualizing printed products from stacks are known, to which devices the products are supplied in batches or continuously. The devices comprise guide means for guiding the buffer stack and conveying means for conveying the products in the buffer stack towards the individualization. The devices also include means for separating single printed products from the one end of the guide means and means for supplying printed products to the opposite end of the guide means. The separating means are usually arranged stationary and the supply means are at least partly movable in the direction of the stack axis (perpendicular to the flat extension of the products), and are adaptable to a varying number of items in the stack (varying stack height).

Depending on the application and according to the characteristics of the items to be individualized, the buffer stacks have rather a standing position (items lie on top of each other with substantially horizontal, flat extension, the stack axis is substantially vertical) or rather a lying position (items stand on one of their edges or narrow sides adjacent to each other with a substantially vertical, flat extension, stack axis horizontal or oblique). In many cases gravity is at least partly exploited for maintaining the stack order and/or for conveying the items toward individualization. In all cases, there are forces for guiding and/or conveying the items. These guiding and/or conveying forces are transmitted via the items in the buffer stack. For preventing such force transmission to have a negative effect on the order of the items in the stack, it is necessary to dimension the forces correspondingly, to adapt the guide means correspondingly, and/or to submit the items to corresponding conditions regarding their mechanical characteristics.

It shows that flat items which all have a substantially identical and well defined flat extension but have, within limits, an irregular and/or changing thickness, (i.e. flat items which can not be arranged in free stacks at all or only very restrictedly), can only be individualized from stacks at very restricted speeds when using known individualizing devices. This is, in particular, due to the fact that such items, especially in a guided stack, have more or less unstable positions and these positions become even more unstable with the transmission of forces via the items and thereby cause stack disturbances.

Items that are difficult to be stacked and thus difficult to be individualized from a stack are, for example, sample bags such as are often found glued into printed products for advertising purposes or added to printed products in other manners. For adding the sample bags to the printed products they need to be individualized from groups. Such sample bags typically consist of two blanks of paper or two blanks of plastic film, which two blanks are connected to each other around their edges forming a cushion shaped cavity between their center areas. The sample bags may carry samples of liquid, paste-like, powdery or granular products, or also soft items (e.g. moisture towels) or small items moving freely in the cavity of the sample bag. This kind of sample bag normally has a fairly well defined, hardly changing flat extension, i.e. it is e.g. square, rectangular or circular and it has sufficient stiffness to be able to stand on one edge when correspondingly supported. Perpendicular to its flat extension however, the sample bag comprises a thickness profile, which cannot only differ from item to item but which can also change depending on handling.

Free stacking of such sample bags is hardly possible or, if possible, only with very small stack height. In a guided stack (e.g. standing stack in a stack shaft or lying stack in a stack channel) it is hardly possible to transmit forces across a larger number of such bags. The positions of the individual bags in the stack are irregular and are not predictable.

In the publication EP-0739822 (or U.S. Pat. No. 5,735,107) it is suggested to stabilize the form of sample bags as described above in order to adapt them to easier stacking and thus easier individualization from a stack. Form stabilization is achieved by stiffening and thickening the bag edges such that they give the sample bag a stable frame by which the bags become easily and stably stackable. Sample bags stabilized in this manner can be individualized with similar methods and similar devices, and at similar high individualizing speeds, as is the case for other simple and stable items such as, for example, postcards.

The above described characteristics regarding stacking are not only a feature of the described sample bags but also of differently shaped bags, which are actually flat but have an easily deformable and/or movable content as well as of at least partly flat items with an actually unchangeable but irregular thickness profile.

SUMMARY OF THE INVENTION

It is the object of the invention to create a method and a device for feeding to individualization flat items with the above mentioned characteristics rendering them difficult to be stacked, such that high individualizing speeds in the range of several ten thousand items per hour becomes possible. Furthermore, method and device are to be easily adaptable to different formats of item.

According to the inventive method the flat items are fed to individualization being arranged in a stack which is substantially lying (stack axis horizontal or oblique) and in which the items are arranged standing on one of their edges. This stack comprises, on its individualization-side, an individualizing stack and, on its supply-side, a pre-stack, whereby the items are individually removed (individualized) from the individualizing stack and are supplied in batches or substantially continuously to the pre-stack and whereby it is the pre-stack that mainly takes over the buffer function.

The individualizing stack is guided by stack guiding means and comprises a considerably smaller number of items than the pre-stack, whereby the number of items in the individualizing stack only varies within very tight limits, i.e. is kept as constant as possible. The pre-stack is also guided by stack guiding means, whereby also each individual item in the pre-stack is guided at least to a restricted degree. The number of items in the pre-stack is considerably larger than in the individualizing stack and due to the buffering function varies considerably more during operation than the number of items in the individualizing stack. The individualizing stack and the pre-stack further differ regarding order conditions, i.e. conditions imposed on the regularity of the item positions, which in the individualizing stack are considerably more important than in the pre-stack.

A device for carrying out the inventive method substantially comprises four regions: a supply region, a pre-stack region, an individualizing-stack region and an individualizing region, which regions follow each other as listed in conveying direction of the items.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
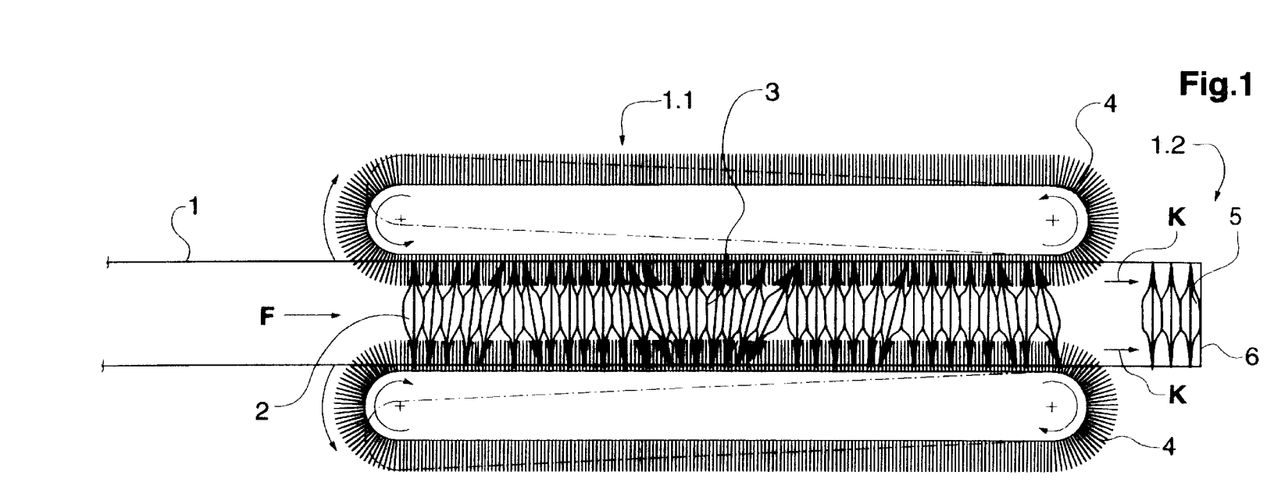
FIGS. 1, 2 and 3 show the principle of the inventive method.
Figure 2:
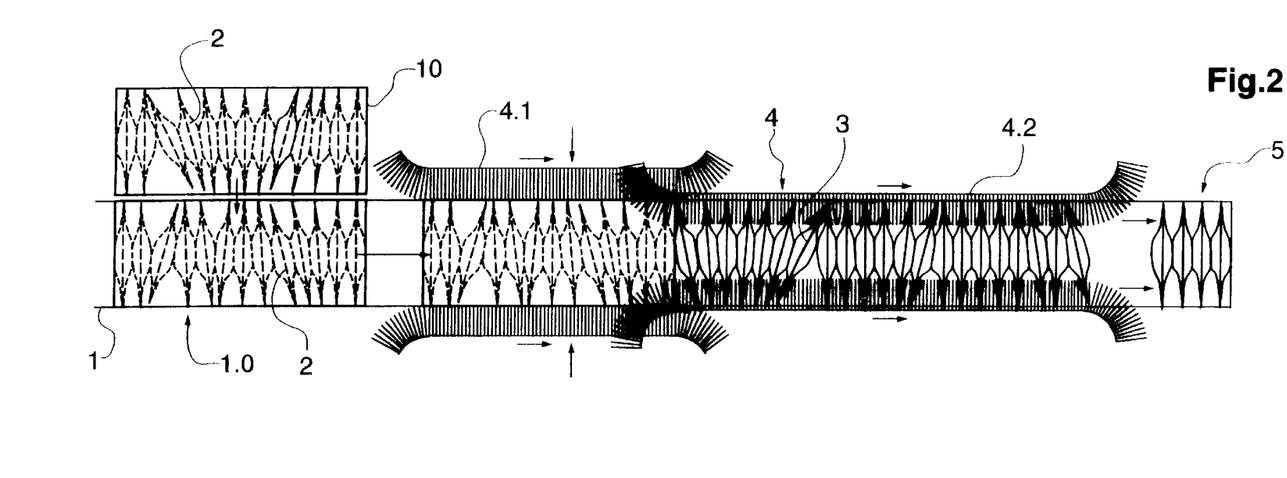
Figure 3:
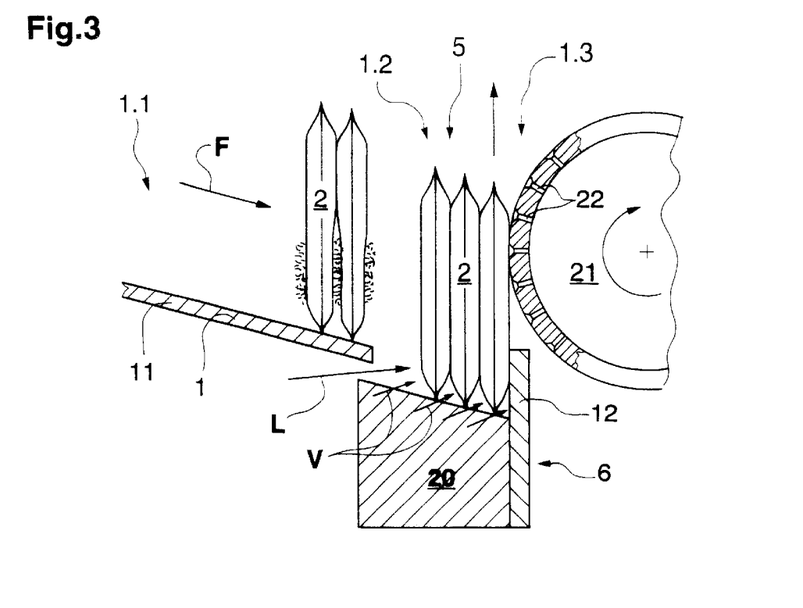

FIGS. 1, 2 and 3 show very diagrammatically the principle of the inventive device with the aid of a preferred embodiment of the inventive device.

FIG. 1 shows a top view of a stack channel 1 with a pre-stack region 1.1 and an individualizing-stack region 1.2. In the stack channel 1, rectangular sample bags (items 2) with an irregular and/or changing thickness profile, as described further above, are conveyed in a substantially lying stack, i.e. standing on one of their edges, in the general conveying direction F towards individualization (end of stack channel 6). The stack channel 1 advantageously slopes in conveying direction F at least in the individualizing-stack region 1.2 and in the intermediate region between pre-stack region 1.1 and individualizing-stack region 1.2 and is adjustable to different formats of items to be individualized at least regarding the channel width.

The floor and the lateral walls of stack channel 1 serve as stack guiding means. Furthermore means for guiding the individual items 2 in the pre-stack 3 are provided in the pre-stack region. These guiding means are designed such that they do not predetermine the positions of the individual items in the pre-stack 3 but such that they can only support the more or less regular order of the items in the pre-stack. The means for guiding the individual items advantageously also serve for conveying and are, for example, designed as a pair brush belts 4 that are driven in opposite directions and that are arranged at a distance from each other and adjustable according to the format of the items to be individualized.

In the individualizing-stack region 1.2 the items 2 form a small individualizing-stack 5 in which they are no longer guided individually but solely by the walls and the floor of stack channel 1, which serve as stack guiding means. The items are conveyed as stack by suitable conveying forces K (e.g. shafts of compressed air) i.e. by forces transmitted via the items towards the individualizing-side end 6 of stack channel 1 towards which they are pressed slightly for further stabilization and as exact positioning as possible. Thereby, the forces K acting on the items are so small that friction created between the items does not negatively influence the individualization. The individualizing-stack region 1.2 is dimensioned such that it is not possible for items in the individualizing stack to deviate from a perpendicular position relative to the conveying direction F by more than a limited amount (e.g. at the most 45°). It is advantageous to maintain a space between pre-stack 3 and individualizing stack 5 that is large enough to allow a problem-free start of the action for the conveying means of the individualizing-stack region and that is, at the same time, small enough to prevent the items in the individualizing stack, which are not individually guided, from falling over.

The length (stack height) of pre-stack 3 is, from the point of view of the method, substantially unlimited and is limited only by the provided means for guiding the individual items. In the case of the sample bags as described further above, it can comprise several hundred bags and during operation vary by hundreds of bags. The length of the individualizing stack 5 is defined by characteristics of the items to be individualized. It is not to be possible in the individualizing stack for an item to be displaced by the forces applied to the individualizing stack 5 from its ideal position perpendicular to the conveying direction such that it is orientated substantially parallel with the conveying direction, as such orientation would disturb the individualizing process. For the mentioned bags, the length of the individualizing stack is in the range of about ten bags and advantageously varies only by about three bags.

The items 2 are supplied to the pre-stack region 1.1 of the stack channel 1 from the top either in batches, such as in stack form, or quasi continuously, such as individually. On supplying, unexceptably large gaps in the pre-stack 3 have to be prevented. Stacked items 2 (feeding in batches) may also be supplied in conveying direction F instead of from the top whereby, during such supply, it is advantageous to remove (deactivate) the means for guiding the individual items (brush belts 4) in the corresponding region. Deactivation or removal of the means for guiding the individual items can be accomplished by swiveling them away, as shown in broken lines in FIG. 1.

Figure 5:
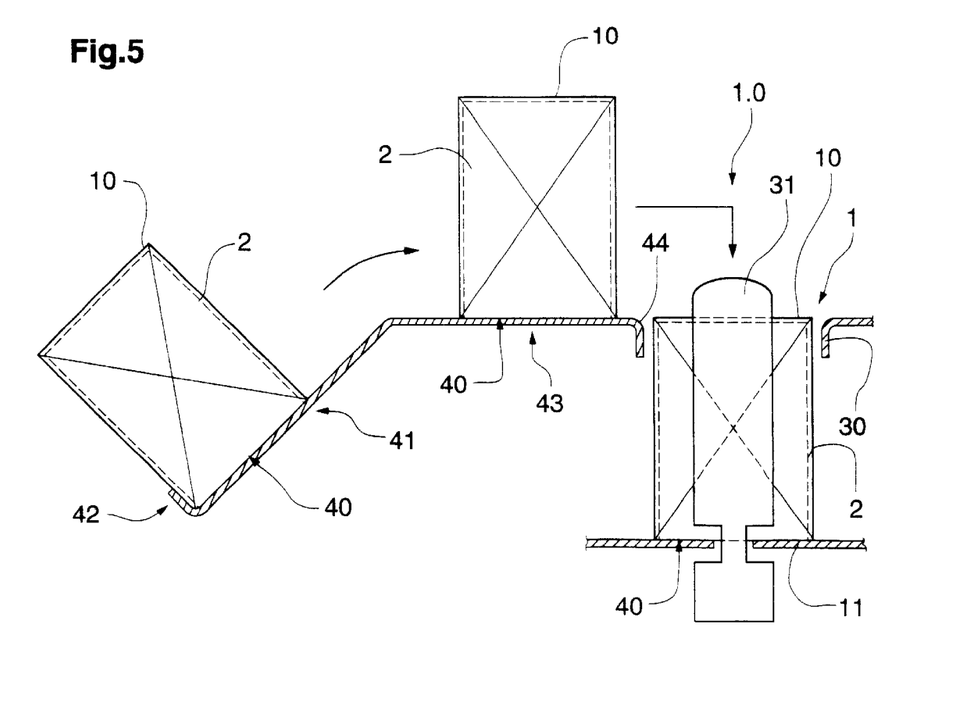
FIGS. 5, 6 and 7 show sections perpendicular to the conveying direction through the embodiment of the inventive device according to FIG. 4.

FIG. 2 illustrates the step (as mentioned already) of the batch-wise item supply to stack 3 in conveying direction, whereby FIG. 2 again shows a top view of a stack channel 1. For such supply, the items 2 are held in lying stacks by corresponding supporting means, for example, in boxes 10 that are open on one side of the stack or in corresponding frames which are open on two opposite sides. The items in the boxes or frames are loosely stacked and laterally supported. Together with the box 10 (opening facing downwards), the stack of items 2 (batch) is positioned in the supply region 1.0 of stack channel 1 (e.g. slid in laterally after removal of the channel wall or as shown in FIG. 5). The stack of items 2 is then conveyed, still together with the box, with suitable means in conveying direction F into the pre-stack region 1.1, for example, with the aid of a slide. Accordingly, the conveying force primarily acts on box 10 and the items 2 are supported in their mutual, loose order.

The means for guiding the individual items (e.g. brush belts 4) in the pre-stack 3 are removed from stack channel 1 when a box 10 is conveyed into pre-stack region 1.1 such that conveyance of box 10 is not obstructed by the guiding means and such that the guiding of the individual items in pre-stack 3 downstream of box 10 is not disturbed. This can, for example, be realized by means of two successive pairs of brush belts 4.1 and 4.2 of which the upstream or entrance-side pair 4.1 has a length which substantially corresponds to the length of one box and can be moved apart perpendicular to the conveying direction. Such an embodiment is shown in FIG. 2. On the other hand, it is possible to also provide only one pair of brush belts and to move only the upstream ends of brush-belts apart in order to remove the means (4) for guiding the individual items of the pre-stack out of the stack channel 1, as indicated in FIG. 1.

As soon as box 10 with items 2 is positioned in pre-stack region 1.1 of stack channel 1 it is removed upwards from stack channel 1. Simultaneously, the means for guiding of the individual items are repositioned such that guiding of the items by box 10 is taken over as continuously as possible by the guiding means of pre-stack region 1.1. If a separate pair 4.1 of brush belts is provided in the region of the box 10 (FIG. 2) it is advantageous to stop its movement in conveying direction F, at least during repositioning, and start it again when box 10 has been fully removed from the region of pre-stack 3.

Instead of the box 10 described above or a corresponding frame for batch-wise supply of items 2 to pre-stack 3, it is also possible to use a device as described in the publication EP-0706967 (or U.S. Pat. No. 5,601,396, F394) of the same applicant. This device comprises two clamping jaws with which a lying stack of items is gripped laterally and can be positioned directly in the pre-stack region 1.1 of an inventive device. FIG. 3 illustrates the step of individualization in a preferred embodiment of the inventive device, of which the end of pre-stack region 1.1, the individualization-stack region 1.2 and the individualization region 1.3 is shown. The stack channel 1 is cut in parallel to conveying direction F and the angle of view is substantially horizontal. Stack channel 1, of which the floor 11 and a stop 12 on the individualization-side end 6 is shown, is, at least in the shown region, sloping slightly downward. The end region of the channel floor 11 is a vibrator 20 that generates a vibration (arrows V) with a component in conveying direction F. The vibrator surface is lowered in relation to the rest of the channel floor 11 such that a step is formed in-between. This step is a suitable means for introducing an additional conveying force in the form of an air stream (arrow L) or a line of substantially parallel air streams.

For the individualizing items 2 from the individualization stack 5, in per se known manner, a roll 21 is provided. The surface of the roll 21 comprises sucking nozzles in predetermined regions 22, i.e. openings connecting the roll surface with an evacuated inner cavity. The roll 21 is dimensioned, arranged and driven such that, due to the effect of the sucking nozzles 22, the front most item of the individualization stack 5 is drawn away upwards in the desired manner from the individualization stack 5 and is introduced between two clamping belts (not shown) for being conveyed away. Due to the effect of the vibrator 20 and the airstreams L the items 2 of the individualization stacks 5 are repositioned after each removal of the front most item for the removal of the next item. Due to the very small number of items in the individualizing stack 5 the items in the stack can be conveyed with very small forces and can be supported against each other such that their relative positions are sufficiently stable for maintaining the stack.

Supply of items 2 from the pre-stack to the individualizing stack 5 can be continuous, whereby the drives of the conveying means of the pre-stack (e.g. brush belts) are coupled with the drive of roll 21. Since the density of the items in pre-stack 3 can vary slightly, it is more advantageous to monitor the number of items in the individualizing stack 5 or the stack height (or length) of the individualizing stack by sensor means and to control the drive of the conveying means of pre-stack 3 for regulating the stack height of individualizing stack 5. Hereby, the number of items in individualizing stack 5 is to be kept at a number corresponding to the characteristics of the items such that individualizing stack 5 is maintained stable in any case.

Figure 4:
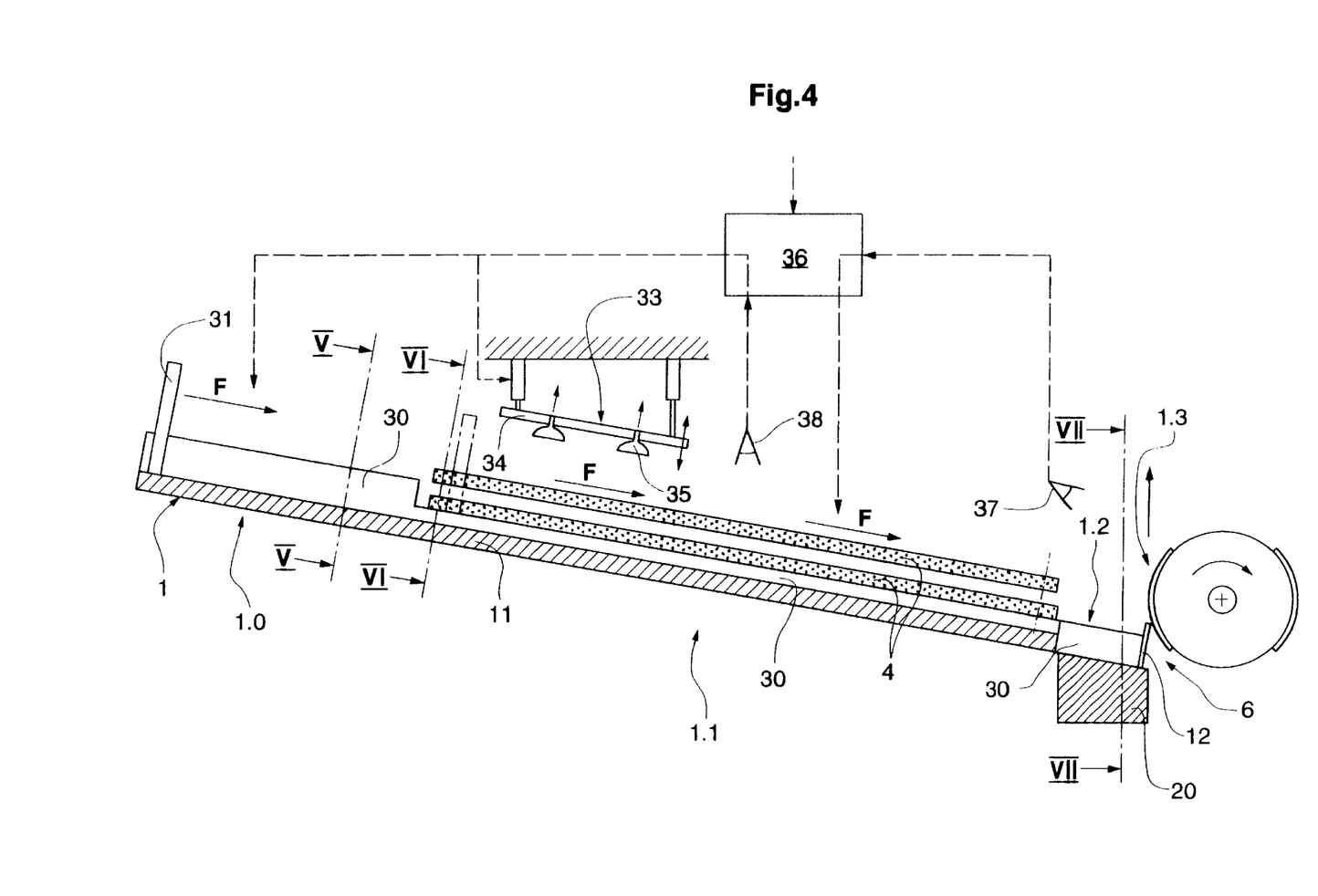
FIG. 4 shows a section parallel to the conveying direction through an exemplified embodiment of the inventive device.

FIG. 4 shows a preferred embodiment of the inventive device in the same view as in FIG. 3. The device serves for carrying out the embodiment of the inventive method as described in connection with FIGS. 1, 2 and 3. Device components which have already been described in connection with these figures redenominated with the same reference numerals.

The device comprises a stack channel 1 with a channel floor 11 and lateral channel walls 30. Stack channel 1 is advantageously sloping downwards in conveying direction F and has an adjustable width. In the region of the channel end 6 a vibrator 20 forms the channel floor and stack channel 1 is closed by a stop 12.

In the conveying direction the following regions succeed along stack channel 1: the supply region 1.0, the pre-stack region 1.1, the individualizing-stack region 1.2, and the individualizing region 1.3. In the supply region 1.0 a slide 31 is provided for displacing a box or a frame with items (not shown) in conveying direction F. In the pre-stack region 1.1 at least one pair of brush belts 4 is provided. The brush belts 4 are removable from the region of the stack channel laterally on the entry side (see FIGS. 1 and 2). In the pre-stack region 1.1 the channel floor 11 may be designed as conveying belt and serve as conveying means in addition to the brush belts 4.

Furthermore, means 33 for removing a box or a frame are provided in the pre-stack region 1.1. These removing means 33, for example, comprise a lowerable traverse 34 with suckers 35. For removal of a box the traverse 34 is lowered onto the box positioned in stack channel 1, the suckers 35 are activated and the traverse 34 is then lifted with the box held by the suckers.

The individualizing-stack region 1.2 and the individualizing region 1.3 are designed as shown in FIG. 3 and were described further above.

FIG. 4, again in a very diagrammatic manner, shows two controls for operating the device. These use a control unit 36. On the one hand, the stack height of the individualizing stack is monitored by sensor means (sensor 37) and the corresponding sensor signal is used for controlling the conveying means in the pre-stack region 1.1.

On the other hand, the stack height of the pre-stack is monitored by sensor means (sensor 38) and the item supply to the pre-stack, e.g. the movement of slide 31 and the movement of the removing means 33 is controlled using the sensor signals.

Figure 6:
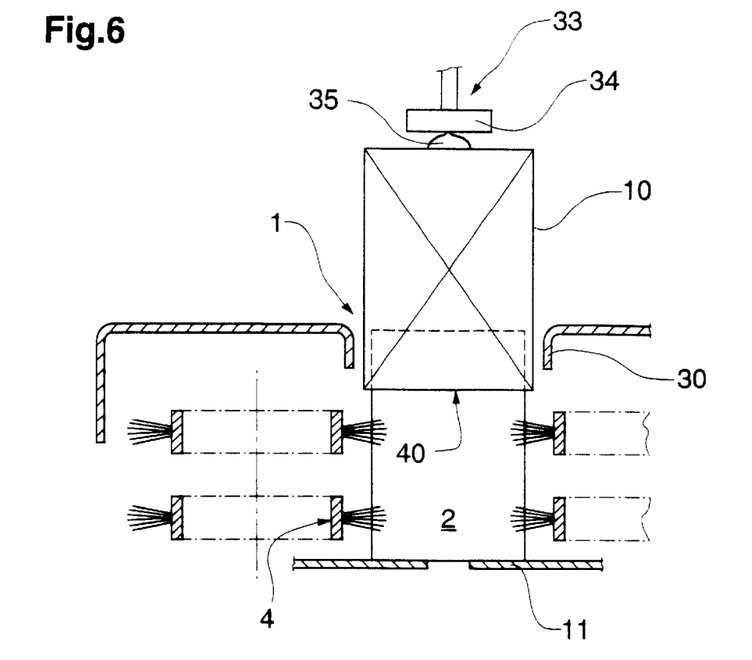
Figure 7:
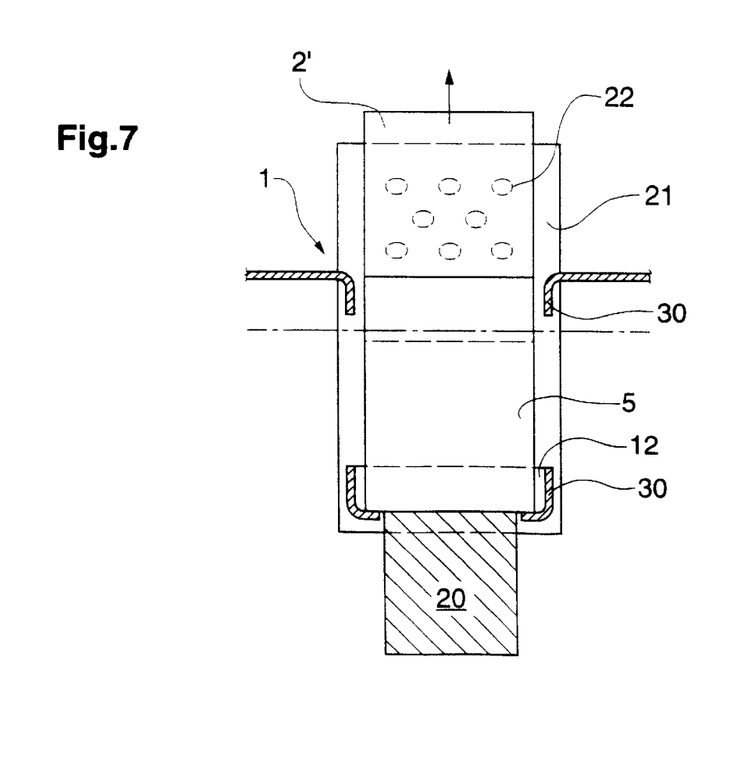

FIGS. 5, 6 and 7 show sections through the embodiment of the inventive device as shown in FIG. 4. The corresponding section planes (V—V, VI—VI and VII—VII) are marked in FIG. 4. Identical device components are again denominated with identical reference numerals.

FIG. 5 shows a section through the supply region 1.0. This section shows a preferred embodiment of device components for supplying items in boxes 10 that are open on one stack side 40. The named device components comprise an ascending ramp 41 with a foot piece 42 and a support surface 43 arranged between ramp 41 and stack channel 1.

A box 10 to be added to the pre-stack 43 is positioned on the support surface 43 with its opening facing downwards and, from this position, is shifted above stack channel 1 and lowered into it. If this process is carried out manually a slight lateral pressure on box 10 can be applied such that the items 2, which are loosely stacked in the box 10, do not fall out of it.

A further box 10 may be shifted from the support surface 43 to the ramp 41, where it is held by foot piece 42. A box positioned in this manner is in readiness and can be moved into stack channel 1 via support surface 43.

FIG. 6 shows a section through stack channel 1 in the entry region of the pre-stack region. The figure shows a stack channel 1 with a channel floor 11 and channel walls 30, a brush-belt-pair 4 as well as means 33 for removing the box 10 from stack channel 1. The shown box 10 is almost completely removed from stack channel 1 and the brush belts 4 are already repositioned. The removal of box 10 with the help of suckers 35 acting on the bottom of the box (opposite of the box opening 40) is advantageous because it prevents forces acting on the box sides and holding the items 2 in box 10.

FIG. 7 shows a section through the stack channel 1 in the individualizing stack region (viewed towards the channel end 6). An item 2' is just being pulled away upwards from individualizing stack 5 by roll 21.

It shows that the inventive device allows to individualize sample bags, as they have been described in the beginning of the present specification, and to supply them for individualization at an individualizing speed of several hundred thousand bags per hour.

What is claimed is:

1. A method for feeding flat items (2) having an irregular and/or changeable thickness profile to individualization, comprising the steps of:

feeding the items (2) to individualization in a conveying direction (F);

buffering and arranging the items in a substantially lying stack (3/5), said lying stack having a varying stack length and the items in said lying stack stand on one edge or narrow side;

individualizing and conveying away the items (2) from a substantially stationary face of the lying stack (3/5) while supplying items to the stack (3/5) via the other face of the lying stack (3/5), and wherein the steps of individualizing, conveying away, and supplying includes the steps of:

supplying items (2) to a pre-stack (3) in stack formations;

conveying each stack formation by a travel in the conveying direction or from above into a pre-stack region (1.1) of said pre-stack (3), said pre-stack region including means for individually laterally guiding each item of each stack formation during conveying of the items toward individualization, said lateral guiding means being deactivated during the travel and reactivated after the travel; and, prior to individualization, transforming the pre-stack (3) into an individualizing stack (5) in which the items (2) are conveyed towards individualization guided as a stack, and wherein, for buffering, a number of items (2) in the pre-stack (5) is variable to a substantially freely selectable degree and the number of items (2) is considerably smaller in the individualizing stack (5) than in the pre-stack (3) and is kept constant within narrow limits.

2. Method according to claim 1, wherein the conveying direction (F) slopes slightly downwards.

3. Method according to claim 1, comprising the further step of supporting the stack formation of items during the travel in one of a box (20) and a frame.

4. Method according to claim 3, comprising the further step of upwardly removing said one of the box (10) and the frame after the travel in the conveying direction (F) and wherein, during removal of said one of said box and frame, said lateral guidance means is deactivated.

5. Method according to claim 1, comprising the further step of clamping each stack formation between two clamping jaws and bringing the clamped stack formations into the pre-stack region (1.1) from above.

6. Method according to claim 1, wherein the items in the individualizing stack (5) are conveyed towards individualization by means of at least one of vibration (V) and air streams (L), while leaning against each other.

7. Method according to claim 6, wherein the number of items (2) in the individualizing stack (5) is adjusted in dependence upon characteristics of the items (2).

8. Method according to claim 1, wherein the items (2) are separated from the individualizing stack (5) by being moved upwards.

9. Device for feeding flat items (2), in particular flat items (2) with an irregular and/or changeable thickness profile, to individualization, said device comprises a stack channel (1) for guiding a substantially lying stack (3/5) of items, means for conveying the items (2) stacked in the stack channel (1) in a conveying direction (F) towards an individualizing-side end (6) of the stack channel (1), means for individualizing the items (2) arranged on the individualizing-side end of the stack channel (1) and means for supplying items (2) to the stack (3/5) in the region of the opposite end of the stack channel (1), wherein the stack channel (1) comprises a pre-stack region (1.1) which, for guiding and conveying the items in conveying direction (F,) is equipped with lateral guiding means acting on individual items (2) stacked in a pre-stack (3) and downstream of the pre-stack region (1.1), an individualizing-stack region (1.2) with means for guiding and conveying an individualizing stack (5), wherein the pre-stack region (1.1) has a considerably greater length than the individualizing-stack region (1.2) and wherein control means are provided for keeping the number of items (2) in the individualizing-stack region constant within narrow limits.

10. Device according to claim 9, wherein the stack channel (1) is arranged sloping downwards towards its individualization-side end (6).

11. Device according to claim 9, wherein the means for supplying items (2) to the pre-stack (3) comprises a supply region (1.0) of the stacking channel (1) arranged upstream of the pre-stack region (1.1) and wherein, in this supply region (1.0), means are provided for shifting of a stack formation of items (2) in the conveying direction (F).

12. Device according to claim 11, wherein the means for shifting is a slide (31).

13. Device according to claim 11, wherein, in an entry region of the pre-stack region (1.1), the lateral guiding means can be activated and deactivated.

14. Device according to claim 12, wherein the lateral guiding means are pairs of brush belts (4, 4.1, 4.2) that can be removed at least partly from the region of the stacking channel (1).

15. Device according to claim 12, wherein, in the entry region of the pre-stack region (1.1), means (33) for removing boxes (10) from the stack channel (1) are provided in which boxes (10) stacked formations of items (2) are shifted from the supply region (1.0) into the pre-stack region (1.1) and are then removed.

16. Device according to claim 12, wherein, for introducing boxes (10) containing a scaled formation of items (2) into the stacking channel (1), a ramp (41) with a foot piece (42) and a support surface (43) is provided in the supply region (1.0).

17. Device according to claim 9, wherein the conveying means in the individualizing-stack region (1.2) of the stack channel (1) comprises a vibrator (20) and air streams (L).

18. Device according to claim 17, wherein a floor (11) of the stack channel (1) comprises a step where the pre-stack region (1.1) meets the individualizing stack region (1.2).

19. Device according to claim 2, wherein the control means are equipped for controlling supply of items (2) to the pre-stack region (1.1).

20. Device according to claim 11, wherein the control means comprise sensor means for monitoring a filling level of the stack channel (1) in the pre-stack region (1.1) and are equipped for controlling, on the basis of said filling level, monitoring the means for shifting scaled formations of items (2) from the supply region (1.0) into the pre-stack region (1.1) and means (3 3) for removing boxes (10) or frames from the pre-stack region (1.1).

21. Device according to claim 15, wherein the control means comprise sensor means for monitoring a filling level of the stack channel (1) in the pre-stack region (1.1) and are equipped for controlling, on the basis of said filling level, monitoring the means for shifting scaled formations of items (2) from the supply region (1.0) into the pre-stack region (1.1) and means (3 3) for removing boxes (10) or frames from the pre-stack region (1.1).

* * * * *

UNITED STATES PATENT AND TRADEMARK OFFICE
CERTIFICATE OF CORRECTION

PATENT NO.   : 6,494,310 B1
DATED        : December 17, 2002
INVENTOR(S)  : Furter It is certified that error appears in the above-identified patent and that said Letters Patent is hereby corrected as shown below:

Column 5,
Line 41, after "device.", begin new paragraph.

Column 6,
Line 26, delete "redenominated" and insert -- denominated --.

Column 10,
Line 4, delete "claim 2" and insert -- claim 9 --.

Signed and Sealed this

Thirteenth Day of May, 2003

JAMES E. ROGAN
*Director of the United States Patent and Trademark Office*